United States Patent
Groll (10) Patent No.: US 11,317,766 B2
(45) Date of Patent: May 3, 2022

(54) COOKWARE RACK

(71) Applicant: All-Clad Metalcrafters LLC, Canonsburg, PA (US)

(72) Inventor: William A. Groll, McMurray, PA (US)

(*) Notice: Subject to any disclaimer, the term of this patent is extended or adjusted under 35 U.S.C. 154(b) by 0 days.

(21) Appl. No.: 16/660,251

(22) Filed: Oct. 22, 2019

(65) Prior Publication Data
US 2020/0121134 A1    Apr. 23, 2020

Related U.S. Application Data

(60) Provisional application No. 62/748,737, filed on Oct. 22, 2018.

(51) Int. Cl.
*A47J 47/16*  (2006.01)
*A47B 55/02*  (2006.01)
*A47F 5/01*   (2006.01)

(52) U.S. Cl.
CPC .............. *A47J 47/16* (2013.01); *A47B 55/02* (2013.01); *A47F 5/01* (2013.01)

(58) Field of Classification Search
CPC ........ A47J 47/16; A47B 55/02; A47B 73/002; A47B 87/001; A47F 3/147; A47F 5/0031; A47F 5/01; A47F 5/13; A47F 7/148
USPC ......... 211/85.31, 181.1, 133.5, 133.2, 41.11, 211/41.4, 126.9; 248/153, 175; D7/601, D7/704, 550.1, 366
See application file for complete search history.

(56) References Cited

U.S. PATENT DOCUMENTS

| | | | | |
|---|---|---|---|---|
| 1,518,148 A | * | 12/1924 | Kamenstein | A47F 5/01 211/200 |
| 1,522,876 A | * | 1/1925 | Genebach | A47F 5/01 248/153 |
| 1,724,385 A | * | 8/1929 | Weston | A47F 5/13 211/130.1 |
| 1,763,419 A | * | 6/1930 | Crossmore | A47F 5/13 248/175 |
| 1,987,378 A | * | 1/1935 | Tansley | B65D 7/24 220/6 |
| 2,081,602 A | * | 5/1937 | Rubenstein | A47F 5/01 211/85 |
| 2,119,442 A | * | 5/1938 | Robinson | A47F 5/13 108/99 |
| 2,122,275 A | * | 6/1938 | Bitney | F24B 1/205 126/25 R |
| 2,480,018 A | * | 8/1949 | Greenberg | A47B 81/007 248/153 |
| D159,217 S | * | 7/1950 | Lydick | D6/678.4 |
| 2,600,191 A | * | 6/1952 | Beach | A47F 5/13 211/194 |

(Continued)

*Primary Examiner* — Jennifer E. Novosad
(74) *Attorney, Agent, or Firm* — The Webb Law Firm (57) ABSTRACT

A cookware rack configured for supporting a cookware set has a lower support section, an intermediate support section, and an upper support section spaced apart from each other by a plurality of posts. Each of the intermediate support section and the upper support section has a pair of longitudinal sides connected to a pair of lateral sides. Each longitudinal side of the intermediate support section and the upper support section has a recessed portion that is offset from end portions connected to opposing ends of the recessed portion. The lower support section has a pair of longitudinal sides connected to a pair of lateral sides and at least one intermediate side connected to the pair of longitudinal sides.

15 Claims, 7 Drawing Sheets

(56) References Cited

U.S. PATENT DOCUMENTS

| | | | | |
|---|---|---|---|---|
| 2,662,662 A * | | 12/1953 | Moorhead | B65D 21/0211 220/485 |
| D178,377 S * | | 7/1956 | Karoff | D7/704 |
| 2,814,390 A * | | 11/1957 | Barbier | A47F 5/13 211/126.9 |
| 2,818,980 A * | | 1/1958 | Losching | A01J 7/025 211/133.5 |
| 2,896,815 A * | | 7/1959 | Longan | A47J 47/16 206/202 |
| 2,934,210 A * | | 4/1960 | Jordan | A47J 47/20 211/41.11 |
| 3,079,206 A * | | 2/1963 | Glezen | A47B 87/02 312/109 |
| 3,083,836 A * | | 4/1963 | Bussemer | F25D 25/022 211/134 |
| 3,171,541 A * | | 3/1965 | Weisberger | A47F 5/01 211/37 |
| 3,214,031 A * | | 10/1965 | McCauley | A47L 15/501 211/41.2 |
| D206,549 S * | | 12/1966 | Callender | D7/409 |
| 3,378,161 A * | | 4/1968 | Lookabaugh | B65D 7/26 220/6 |
| 3,487,951 A * | | 1/1970 | Beltzung | A47F 5/01 211/133.2 |
| 3,524,565 A * | | 8/1970 | Wilson | B65D 21/048 220/491 |
| 3,848,748 A * | | 11/1974 | Ceccarelli | B42F 15/0094 211/195 |
| 4,117,783 A * | | 10/1978 | Eckel | A47B 87/0215 108/190 |
| 4,191,160 A * | | 3/1980 | Elliott | A47J 37/0763 126/25 R |
| 4,616,756 A * | | 10/1986 | Holtz | B41J 11/58 211/132.1 |
| 4,632,259 A * | | 12/1986 | Cameron | A47J 47/16 211/119 |
| 4,718,402 A * | | 1/1988 | Fordyce | F24C 15/16 126/337 R |
| 4,730,799 A * | | 3/1988 | Foss | B25H 3/006 211/106 |
| 4,821,885 A * | | 4/1989 | Ondrasik | B65D 21/048 206/505 |
| 4,920,873 A * | | 5/1990 | Stevens | A47J 27/14 126/246 |
| 4,943,029 A * | | 7/1990 | Szuster | A47B 55/02 248/639 |
| 4,978,013 A * | | 12/1990 | Hogg | A47F 5/13 211/132.1 |
| 5,022,540 A * | | 6/1991 | Vail, Sr. | A47F 5/01 206/513 |
| 5,035,335 A * | | 7/1991 | Massoudnia | A47B 87/0207 211/188 |
| D323,255 S * | | 1/1992 | Titus | D34/5 |
| 5,086,936 A * | | 2/1992 | Remmers | A47B 67/04 211/126.15 |
| 5,094,352 A * | | 3/1992 | Green, Sr. | A47J 47/16 211/186 |
| 5,097,971 A * | | 3/1992 | Norris | A47B 87/0207 211/126.6 |
| D326,946 S * | | 6/1992 | Szuster | D3/306 |
| 5,152,407 A * | | 10/1992 | Massoudnia | A47B 55/02 211/126.15 |
| D334,307 S * | | 3/1993 | Lee | D3/306 |
| 5,213,221 A * | | 5/1993 | Raye, Sr. | D06F 57/08 211/181.1 |
| 5,314,080 A * | | 5/1994 | Wentworth | A47F 5/0062 211/181.1 |
| 5,330,060 A * | | 7/1994 | Bohner | A47B 31/00 211/41.4 |
| 5,435,295 A * | | 7/1995 | Gerrard | F24B 1/193 126/152 B |
| D364,074 S * | | 11/1995 | Yeh | D6/678.4 |
| D364,288 S * | | 11/1995 | Kramer | D7/388 |
| D367,375 S * | | 2/1996 | Vukelich, Sr. | D6/405 |
| 5,638,809 A * | | 6/1997 | Wienhold | F24C 15/16 126/29 |
| 5,791,265 A * | | 8/1998 | Ellsworth | A47B 47/00 108/180 |
| 5,823,100 A * | | 10/1998 | Wienhold | F24C 15/16 99/449 |
| 5,996,812 A * | | 12/1999 | Sokol, Jr. | B42F 7/10 211/11 |
| 6,003,692 A * | | 12/1999 | Kozak | A47F 5/0031 211/128.1 |
| 6,161,808 A * | | 12/2000 | East | A47B 37/00 211/189 |
| 6,308,841 B1 * | | 10/2001 | Donnelly | A47B 55/02 211/181.1 |
| 6,318,570 B1 * | | 11/2001 | Mueller | A47B 87/0207 211/126.7 |
| D494,819 S * | | 8/2004 | Schwartzkopf | D7/601 |
| D556,476 S * | | 12/2007 | Butler | D6/675.2 |
| 7,828,160 B2 * | | 11/2010 | Lin | A47B 73/002 211/181.1 |
| D737,105 S * | | 8/2015 | Tsai | D7/601 |
| 9,839,329 B2 * | | 12/2017 | Chu | A47J 47/16 |
| D843,792 S * | | 3/2019 | Hsu | D7/637 |
| 2006/0237379 A1 * | | 10/2006 | Yang | A47L 19/04 211/41.4 |
| 2007/0215566 A1 * | | 9/2007 | Shen | A47F 5/01 211/85.5 |
| 2007/0295675 A1 * | | 12/2007 | Anker | A47J 47/16 211/31 |
| 2009/0258127 A1 * | | 10/2009 | Holtz | A47J 36/26 426/412 |
| 2011/0094982 A1 * | | 4/2011 | Shen | A47J 47/16 211/59.4 |
| 2013/0313211 A1 * | | 11/2013 | Skvorecz | A47J 36/24 211/85.31 |
| 2020/0121134 A1 * | | 4/2020 | Groll | A47J 47/16 |

* cited by examiner

COOKWARE RACK

CROSS-REFERENCE TO RELATED APPLICATION

This application claims priority to U.S. Provisional Application No. 62/748,737, filed Oct. 22, 2018, the disclosure of which is hereby incorporated by reference in its entirety.

BACKGROUND OF THE DISCLOSURE

Field of the Disclosure

The present disclosure relates generally to a storage rack and, in particular, to a cookware storage rack configured for storing a set of cookware in a stacked or nested arrangement.

Description of the Related Art

Cookware sets typically include a collection of cookware that ranges from small frying pans to large stockpots. For example, a typical cookware set may include a plurality of different sized frying pans, one or more sauté pans, one or more sauce pans, one or more stockpots, and a plurality of lids for enclosing the cookware.

When not in use, the cookware is typically stored in kitchen cabinets, on countertop racks, or hanging racks. Due to a large number of pieces of cookware in a cookware set, a significant volume of space is required to store the cookware. In some examples, cookware may be stacked in a nested fashion, such as by stacking smaller pots and pans inside larger pots and pans. Some cookware sets are designed with this constraint in mind, often at the expense of utility of the cookware. For example, instead of having an industry standard size, such as 2 quart or a 3 quart size, the cookware that is designed for nesting or stacking may have an intermediate size which can make the cookware unsuitable for its intended use. While such a stacked arrangement decreases the footprint taken up by the cookware set, the cookware set is designed to benefit stackability, rather than benefit the utility of the cookware. Furthermore, existing stackable cookware sets do not allow for an organized storage of lids. Thus, a cook must first retrieve a pot or a pan of desired size, and then find an appropriate lid. Existing solutions for storing cookware are not configured for storing a complete cookware set, including the lids in a stacked arrangement that minimizes the footprint of the cookware during storage.

While a variety of cookware storage solutions exist in the art, there is a continued need in the art for improved cookware racks that provide an effective and efficient storage of a cookware set.

SUMMARY OF THE DISCLOSURE

Generally, provided is an improved cookware storage rack configured for storing a set of cookware in a stacked or nested arrangement. In particular, provided is an improved cookware storage rack that is configured for storing a set of cookware in a stacked or nested arrangement, wherein the cookware is designed with cooking utility as a primary consideration, rather than stackability.

In some non-limiting embodiments or aspects, a cookware rack may have a lower support section, at least one intermediate support section, and an upper support section spaced apart from each other by a plurality of posts. Each of the at least one intermediate support section and the upper support section may have a pair of longitudinal sides connected to a pair of lateral sides. Each longitudinal side of the at least one intermediate support section and the upper support section may have a recessed portion that is offset from end portions thereof.

In other non-limiting embodiments or aspects, the lower support section may have a pair of longitudinal sides connected to a pair of lateral sides and at least one intermediate side connected to the pair of longitudinal sides. The lower support section may have a spacer for spacing the cookware rack section from a support surface. A height of the spacer may be adjustable. A spacing between the lower support section and the intermediate support section may be larger than a spacing between the intermediate support section and the upper support section. A surface area of the lower support section may be larger than a surface area of the intermediate support section and the upper support section.

In other non-limiting embodiments or aspects, the longitudinal sides of each of the lower support section, the at least one intermediate support section, and the upper support section may be parallel to each other. Similarly, the lateral sides of each of the lower support section, the at least one intermediate support section, and the upper support section may be parallel to each other. The longitudinal sides of each of the lower support section, the at least one intermediate support section, and the upper support section may be perpendicular to the lateral sides of each of the lower support section, the at least one intermediate support section, and the upper support section.

In other non-limiting embodiments or aspects, at least one of the lower support section, the at least one intermediate support section, and the upper support section may have at least one intermediate side connected to the pair of longitudinal sides of at least one of the lower support section, the at least one intermediate support section, and the upper support section. The at least one intermediate side may be perpendicular to the longitudinal sides of each of the lower support section, the at least one intermediate support section, and the upper support section.

In other non-limiting embodiments or aspects, each of the lateral sides of the at least one intermediate support section may have a handle loop that is spaced apart from the posts by a clearance space. The handle may have a U-shape. The cookware rack may be made from a metal wire rod, such as a metal wire rod made from stainless steel.

In other non-limiting embodiments or aspects, a cookware rack configured for supporting a cookware set may have a pair of supports, with each support having a pair of posts connected to a lower side, an intermediate side, and an upper side. The cookware rack further may have a lower support section pivotally mounted to the lower side of each support, an intermediate support section pivotally mounted to the intermediate side of each support, and an upper support section pivotally mounted to the upper side of each support. The supports may be pivotally movable between an assembled position and a disassembled position.

In other non-limiting embodiments or aspects, at least one locking plate may be removably connectable to the posts of the supports for locking the supports in the assembled position. The at least one locking plate may have a plurality of openings each configured to receive a corresponding pin connected to the supports. At least one locking nut may be removably connectable to the pin to retain the at least one locking plate on the supports. The intermediate side and the upper side of each support may have a recessed portion that is offset from end portions connected to opposing ends of the recessed portion.

Further non-limiting embodiments or aspects are set forth in the following numbered clauses.

Clause 1. A cookware rack configured for supporting a cookware set, the cookware rack comprising: a lower support section, at least one intermediate support section, and an upper support section spaced apart from each other by a plurality of posts, each of the at least one intermediate support section and the upper support section having a pair of longitudinal sides connected to a pair of lateral sides, wherein each longitudinal side of the at least one intermediate support section and the upper support section has a recessed portion that is offset from end portions connected to opposing ends of the recessed portion.

Clause 2. The cookware rack of clause 1, wherein the lower support section has a pair of longitudinal sides connected to a pair of lateral sides.

Clause 3. The cookware rack of clause 1 or 2, wherein the lower support section has a spacer for spacing the cookware rack section from a support surface.

Clause 4. The cookware rack of clause 3, wherein a height of the spacer is adjustable.

Clause 5. The cookware rack of any of clauses 1-4, wherein a spacing between the lower support section and the at least one intermediate support section is larger than a spacing between the at least one intermediate support section and the upper support section.

Clause 6. The cookware of any of clauses 1-5, wherein a surface area of the lower support section is larger than a surface area of the at least one intermediate support section and the upper support section.

Clause 7. The cookware rack of any of clauses 1-6, wherein the longitudinal sides of each of the lower support section, the at least one intermediate support section, and the upper support section are parallel to each other.

Clause 8. The cookware rack of any of clauses 1-7, wherein the lateral sides of each of the lower support section, the at least one intermediate support section, and the upper support section are parallel to each other.

Clause 9. The cookware rack of any of clauses 1-8, wherein the longitudinal sides of each of the lower support section, the at least one intermediate support section, and the upper support section are perpendicular to the lateral sides of each of the lower support section, the at least one intermediate support section, and the upper support section.

Clause 10. The cookware rack of any of clauses 1-9, wherein at least one of the lower support section, the at least one intermediate support section, and the upper support section has at least one intermediate side connected to the pair of longitudinal sides of at least one of the lower support section, the at least one intermediate support section, and the upper support section.

Clause 11. The cookware rack of clause 10, wherein the at least one intermediate side is substantially perpendicular to the longitudinal sides of each of the lower support section, the at least one intermediate support section, and the upper support section.

Clause 12. The cookware rack of any of clauses 1-11, wherein each of the lateral sides of the at least one intermediate support section has a handle loop that is spaced apart from the posts by a clearance space.

Clause 13. The cookware rack of clause 12, wherein the handle has a U-shape.

Clause 14. The cookware rack of any of clauses 1-13, wherein the cookware rack is made from a metal wire rod.

Clause 15. The cookware rack of clause 14, wherein the metal wire rod is made from stainless steel.

Clause 16. A cookware rack configured for supporting a cookware set, the cookware rack comprising: a pair of supports, each support having a pair of posts connected to a lower side, an intermediate side, and an upper side; a lower support section pivotally mounted to the lower side of each support; an intermediate support section pivotally mounted to the intermediate side of each support; and an upper support section pivotally mounted to the upper side of each support, wherein the supports are pivotally movable between an assembled position and a disassembled position.

Clause 17. The cookware rack of clause 16, further comprising at least one locking plate removably connectable to the posts of the supports for locking the supports in the assembled position.

Clause 18. The cookware rack of clause 17, wherein the at least one locking plate has a plurality of openings each configured to receive a corresponding pin connected to the supports.

Clause 19. The cookware rack of clause 18, further comprising at least one locking nut removably connectable to the pin to retain the at least one locking plate on the supports.

Clause 20. The cookware rack of any of clauses 16-19, wherein the intermediate side and the upper side of each support has a recessed portion that is offset from end portions connected to opposing ends of the recessed portion.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

In FIGS. 1-8, like characters refer to the same components and elements, as the case may be, unless otherwise stated.

DETAILED DESCRIPTION OF THE DISCLOSURE

As used herein, the singular form of "a", "an", and "the" includes plural referents unless the context clearly dictates otherwise.

Spatial or directional terms, such as "left", "right", "inner", "outer", "above", "below", and the like, relate to the embodiments or aspects as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of the embodiments or aspects may describe certain features as being "particularly" or "preferably" within certain limitations (e.g., "preferably", "more preferably", or "even more preferably", within certain limitations). It is to be understood that the disclosure is not limited to these particular or preferred limitations but encompasses the entire scope of the disclosure.

Figure 1:
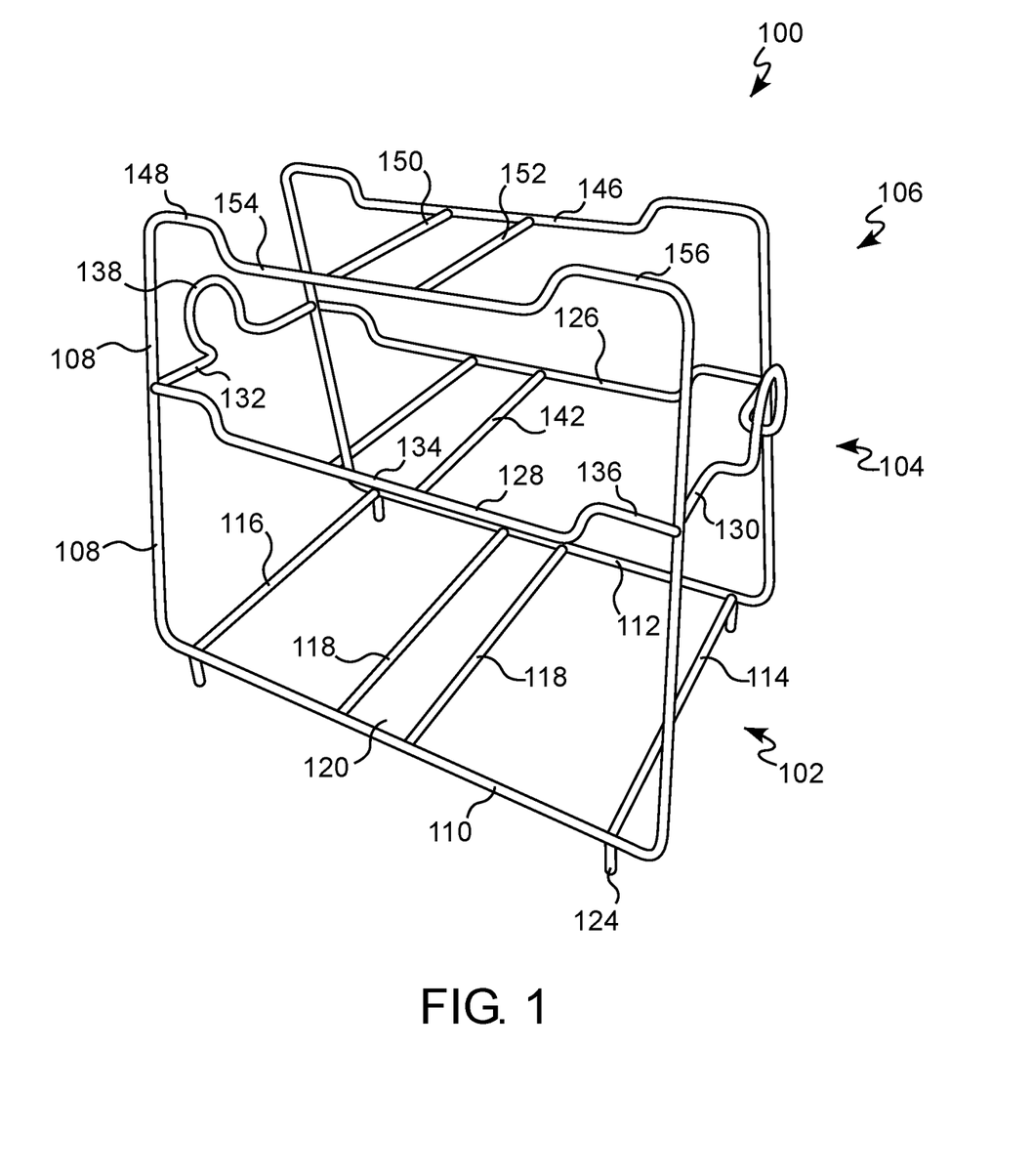
FIG. 1 is a front perspective view of a cookware rack in accordance with one non-limiting embodiment or aspect of the present disclosure.
Figure 2:
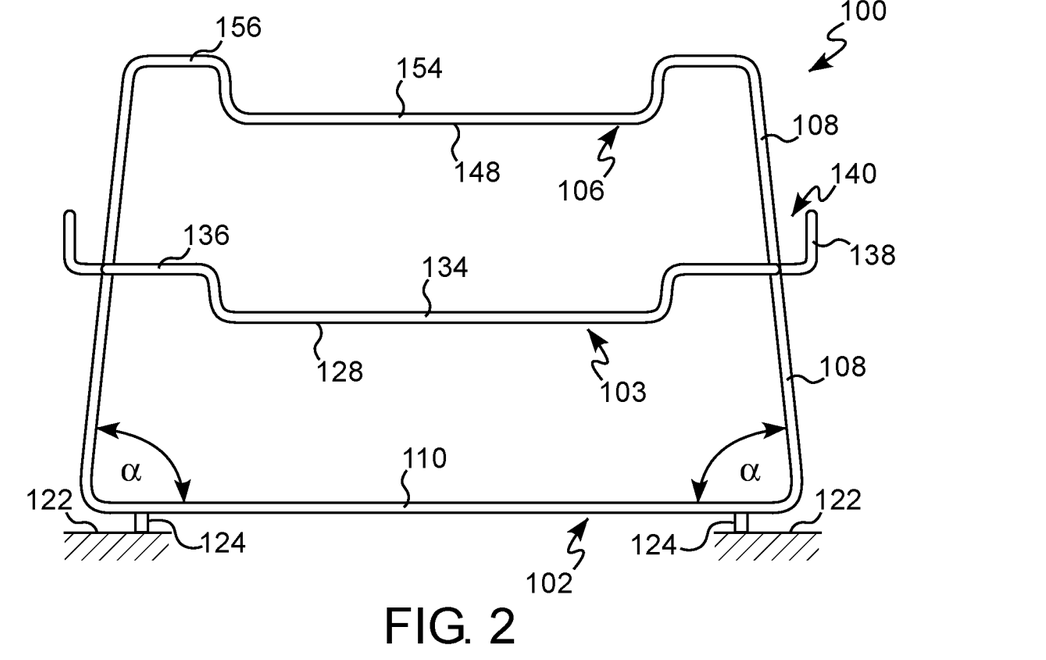
FIG. 2 is a front view of the cookware rack shown in FIG. 1.
Figure 3:
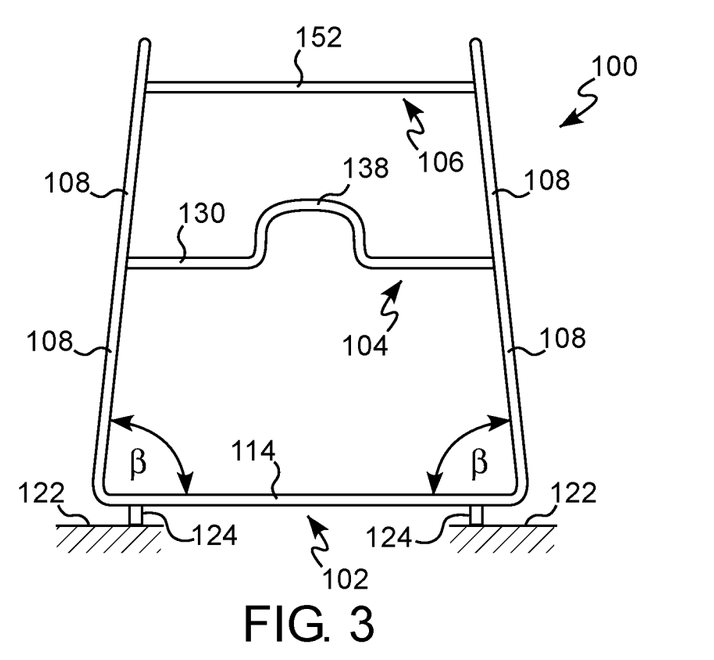
FIG. 3 is side view of the cookware rack shown in FIG. 1.

In various non-limiting embodiments or aspects, and with reference to FIGS. 1-3, the present disclosure is directed to a cookware rack 100 configured for storing a cookware set in a stacked or nested arrangement. The cookware rack 100 is configured for minimizing the footprint of the cookware set during storage such that the cookware set can be stored efficiently and effectively in a kitchen cabinet or on a countertop.

With continued reference to FIG. 1-3, the cookware rack 100 has a plurality of vertically-offset support sections. For example, the cookware rack 100 may have a lower support section 102, an upper support section 106, and at least one intermediate support section 104 positioned between the lower support section 102 and the upper support section 106. Each of the support sections 102, 104, 106 is configured for supporting a portion of a cookware set, as described herein. The support sections 102, 104, 106 are spaced apart from each other by a plurality of posts 108. The spacing between the lower support section 102 and the at least one intermediate support section 104 may be the same as the spacing between the at least one intermediate support section 104 and the upper support section 106. In some embodiments or aspects, the spacing between the lower support section 102 and the at least one intermediate support section 104 may be larger or smaller than the spacing between the at least one intermediate support section 104 and the upper support section 106.

With reference to FIG. 1, the lower support section 102 may cover the largest surface area of the three support sections, with the upper support section 106 covering the smallest surface area. In this manner, the lower support section 102 may be configured for supporting the largest cookware of the cookware set, such as the stockpot, while the intermediate and upper support sections 104, 106 may be configured for supporting successively smaller cookware. Due to this arrangement, the cookware rack 100 may have a substantially trapezoidal shape when viewed from the front (FIG. 2) and/or the side (FIG. 3). The posts 108 may be angled relative to the lower support section 102 at an angle α when viewed from the front side of the cookware rack 100 (FIG. 2). The posts 108 may be further angled relative to the lower support section 102 at an angle β when viewed from the side of the cookware rack 100 (FIG. 3).

With continued reference to FIG. 1, the lower support section 102 has a pair of longitudinal sides 110, 112 arranged substantially parallel to each other and offset from each other by a pair of lateral sides 114, 116. The longitudinal sides 110, 112 and the lateral sides 114, 116 define a substantially planar shape of the lower support section 102. Each of the longitudinal sides 110, 112 and the lateral sides 114, 116 may be substantially straight. The longitudinal sides 110, 112 may be arranged substantially perpendicular to the lateral sides 114, 116.

At least one intermediate side 118 is connected to the longitudinal sides 110, 112. The at least one intermediate side 118 may be positioned between the terminal ends of the longitudinal sides 110, 112. The at least one intermediate side 118 may be substantially perpendicular to the longitudinal sides 110, 112. In some embodiments or aspects, a pair of intermediate sides 118 is connected to each longitudinal side 110, 112. The intermediate sides 118 are positioned between the lateral sides 114, 116 and are spaced from each other by a space 120 having sufficient width to accommodate a handle of a lid. In this manner, the lid can be stored on the lower support section 102 by inserting the lid handle between the intermediate sides 118 and supporting the upper surface of the lid on the lower support section 102.

The lower support section 102 may be offset from a support surface 122 (shown in FIGS. 2-3), such as the countertop, by a plurality of spacers 124. In some embodiments or aspects, the spacers 124 may have a fixed height. In other embodiments or aspects, the spacers 124 may be adjustable to adjust the spacing of the lower support section 102 from the support surface 122.

With continued reference to FIG. 1, the at least one intermediate support section 104 has a pair of longitudinal sides 126, 128 arranged substantially parallel to each other and offset from each other by a pair of lateral sides 130, 132. The longitudinal sides 126, 128 of the at least one intermediate support section 104 may be substantially parallel with the longitudinal sides 110, 112 of the lower support section 102. Similarly, the lateral sides 130, 132 of the at least one intermediate support section 104 may be substantially parallel with the lateral sides 114, 116 of the lower support section 102. The longitudinal sides 126, 128 may be arranged substantially perpendicular to the lateral sides 130, 132.

Each of the longitudinal sides 126, 128 may have a recessed portion 134 that is vertically offset from end portions 136 at opposing ends of the longitudinal sides 126, 128. The end portions 136 may be substantially parallel to each other. In this manner, the recessed portion 134 is positioned in a first plane or at a first height that is vertically offset from a second plane or a second height of the end portions 136. A longitudinal length of the recessed portion 134 is selected such that selected cookware of the cookware set can be received therein. The longitudinal length of the recessed portion 134 may be smaller than a diameter of the cookware to be received therein. Once positioned in the recessed portion 134, the cookware cannot be removed simply by sliding the cookware relative to the intermediate support section 104. Instead, the cookware must be first lifted from being supported by the recessed portion 134 before being moved laterally relative to the recessed portion 134. In this manner, the cookware cannot be accidentally bumped and slid off of the intermediate support section 104.

With continued reference to FIG. 1, each of the lateral sides 130, 132 may have a handle loop 138. The handle loop 138 may have a U-shape and is spaced apart from the posts 108 by a clearance space 140 (see FIG. 2). The handle loop 138 can be used as a gripping surface during lifting and moving of the cookware rack 100. In addition, each handle loop 138 can be used to support a lid, as shown in FIGS. 4-5.

With continued reference to FIG. 1, at least one intermediate side 142 is connected to the longitudinal sides 126, 128. The at least one intermediate side 142 may be positioned between the terminal ends of the longitudinal sides 126, 128. The at least one intermediate side 142 may be substantially perpendicular to the longitudinal sides 126, 128. In some embodiments or aspects, a pair of intermediate sides 142 is connected to each longitudinal side 126, 128 of the intermediate support section 104. The intermediate sides 142 are positioned between the lateral sides 130, 132 and are spaced from each other by a space 144 having sufficient width to accommodate a handle of a lid. In this manner, the lid can be stored on the intermediate support section 104 by inserting the lid handle between the intermediate sides 142 and supporting the upper surface of the lid on the intermediate support section 104. The intermediate sides 142 also prevent cookware having a diameter smaller than the length of the lateral sides 130, 132 from falling through the intermediate support section 104.

With continued reference to FIG. 1, the upper support section 106 has a pair of longitudinal sides 146, 148 arranged substantially parallel to each other and offset from each other by a pair of intermediate sides 150, 152. The intermediate sides 150, 152 may be arranged substantially parallel with each other, and substantially perpendicular to the longitudinal sides 146, 148. Each of the longitudinal sides 146, 148 has a recessed portion 154 that is vertically offset from end portions 156 at terminal ends of the longitudinal sides 146, 148. In this manner, the recessed portion 154 is positioned in a first plane or at a first height that is vertically offset from a second plane or a second height of the end portions 156. A longitudinal length of the recessed portion 154 is selected such that selected cookware of the cookware set is received therein. A longitudinal length of the recessed portion 154 is selected such that selected cookware of the cookware set is received therein. Once positioned in the recessed portion 154, the cookware cannot be removed simply by sliding the cookware relative to the upper support section 106. Instead, the cookware must be first lifted from being supported by the recessed portion 154 before being moved laterally relative to the recessed portion 154. In this manner, the cookware cannot be accidentally bumped and slid off of the upper support section 106.

Figure 4:
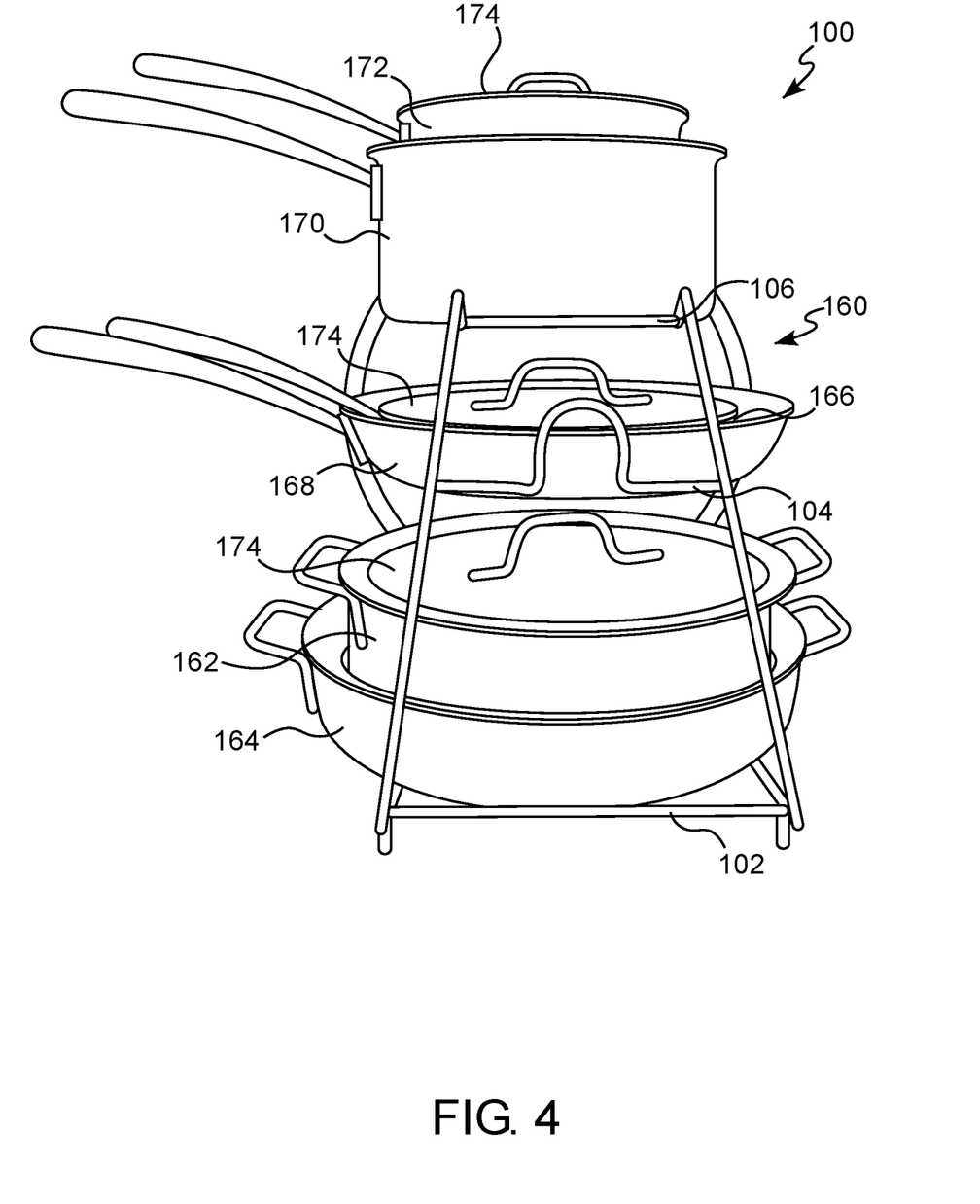
FIG. 4 is side perspective view of the cookware rack of FIG. 1 shown with a set of cookware stacked or nested on the cookware rack.
Figure 5:
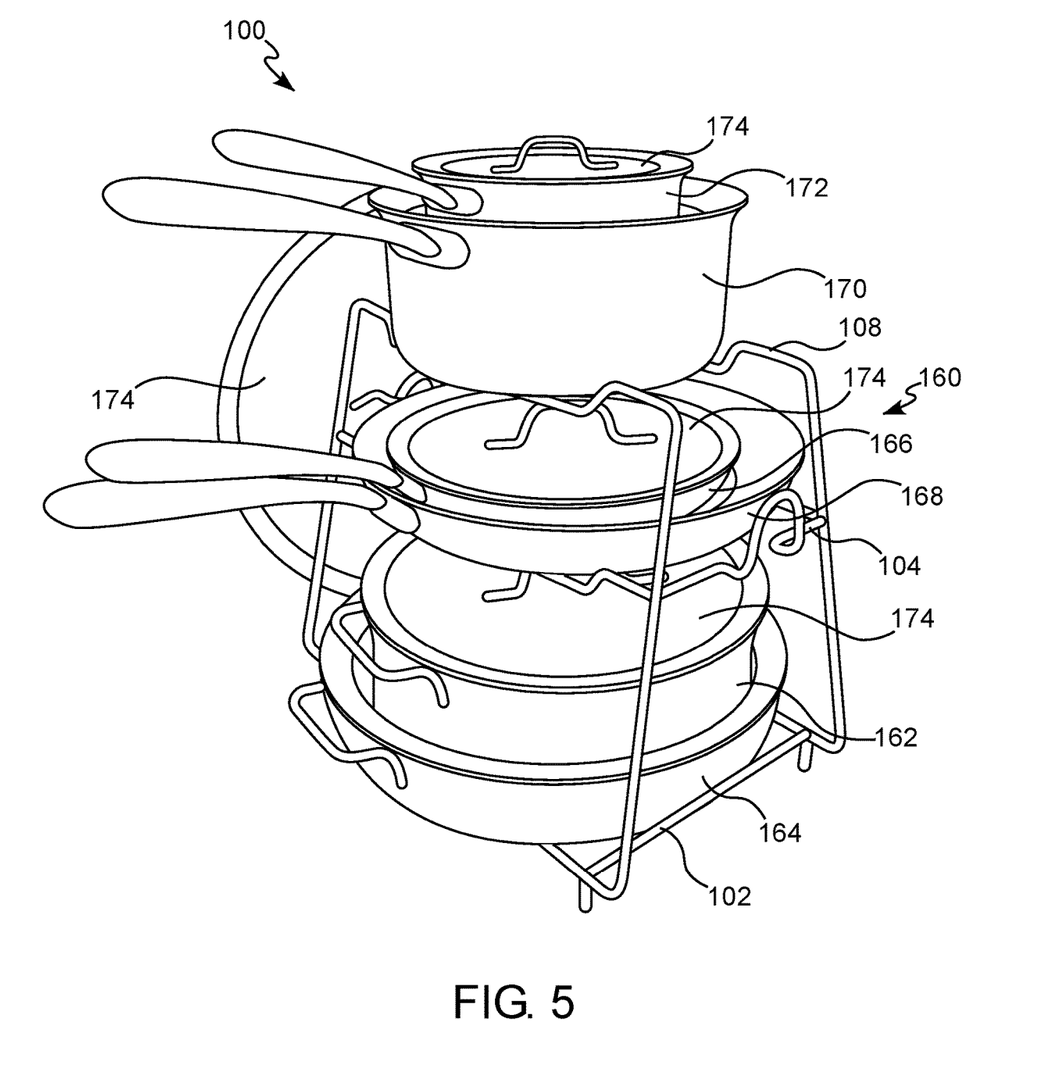
FIG. 5 is front perspective view of the cookware rack of FIG. 1 shown with a set of cookware stacked or nested on the cookware rack.

With reference to FIGS. 4-5, the cookware rack 100 is shown in combination with a cookware set 160. In some embodiments or aspects, the cookware set 160 may be a conventional cookware set that is not specifically designed with stackability as a primary design consideration. The cookware set 160 may be a 10-piece cookware set having a large stockpot 162, a large sauté pan 164, a pair of frying pans 166, 168, a pair of sauce pans 170, 172, and a selection of four lids 174 of various sizes for enclosing the cookware of the cookware set 160. The cookware rack 100 is configured to support the largest cookware of the cookware set 160, such as the stockpot 162 and the sauté pan 164, on the lower support section 102. The stockpot 162 is dimensioned such that it can be nested or stacked within the sauté pan 164. The intermediate support section 104 is spaced apart from the lower support section 102 to allow the stacked arrangement of the stockpot 162 and the sauté pan 164 to be inserted therebetween with the stockpot lid 174 covering the stockpot 162. The stockpot 162 and the sauté pan 164 can be removed from the lower support section 102 by sliding the sauté pan 164 from the lower support section 102.

With continued reference to FIGS. 4-5, the cookware rack 100 is configured to support the pair of frying pans 166, 168 on the intermediate support section 104. The frying pans 166, 168 are dimensioned such that the smaller of the two can be nested or stacked within the larger one. The larger of the two frying pans 166, 168 is accommodated in the recessed portion 134 of the longitudinal sides 126, 128. Once positioned in the recessed portion 134, the frying pans 166, 168 cannot be removed simply by sliding the frying pans 166, 168 relative to the intermediate support section 104. Instead, the frying pans 166, 168 must be first lifted from being supported by the recessed portion 134 before being moved laterally relative to the recessed portion 134. In this manner, the frying pans 166, 168 cannot be accidentally bumped and slid off of the intermediate support section 104. At least one lid 174 for enclosing the frying pans 166, 168 may be accommodated in the space between the intermediate support section 104 and the upper support section 106.

With continued reference to FIGS. 4-5, the cookware rack 100 is configured to support the pair of sauce pans 170, 172 on the upper support section 106. The sauce pans 170, 172 are dimensioned such that the smaller of the two can be nested or stacked within the larger one. The larger of the two sauce pans 170, 172 is accommodated in the recessed portion 154 of the longitudinal sides 156, 158. Once positioned in the recessed portion 154, the sauce pans 170, 172 cannot be removed simply by sliding the sauce pans 170, 172 relative to the upper support section 106. Instead, the sauce pans 170, 172 must be first lifted from being supported by the recessed portion 154 before being moved laterally relative to the recessed portion 154. In this manner, the sauce pans 170, 172 cannot be accidentally bumped and slid off of the upper support section 106. At least one lid 174 for enclosing the sauce pans 170, 172 may be placed on the sauce pans 170, 172.

Figure 6:
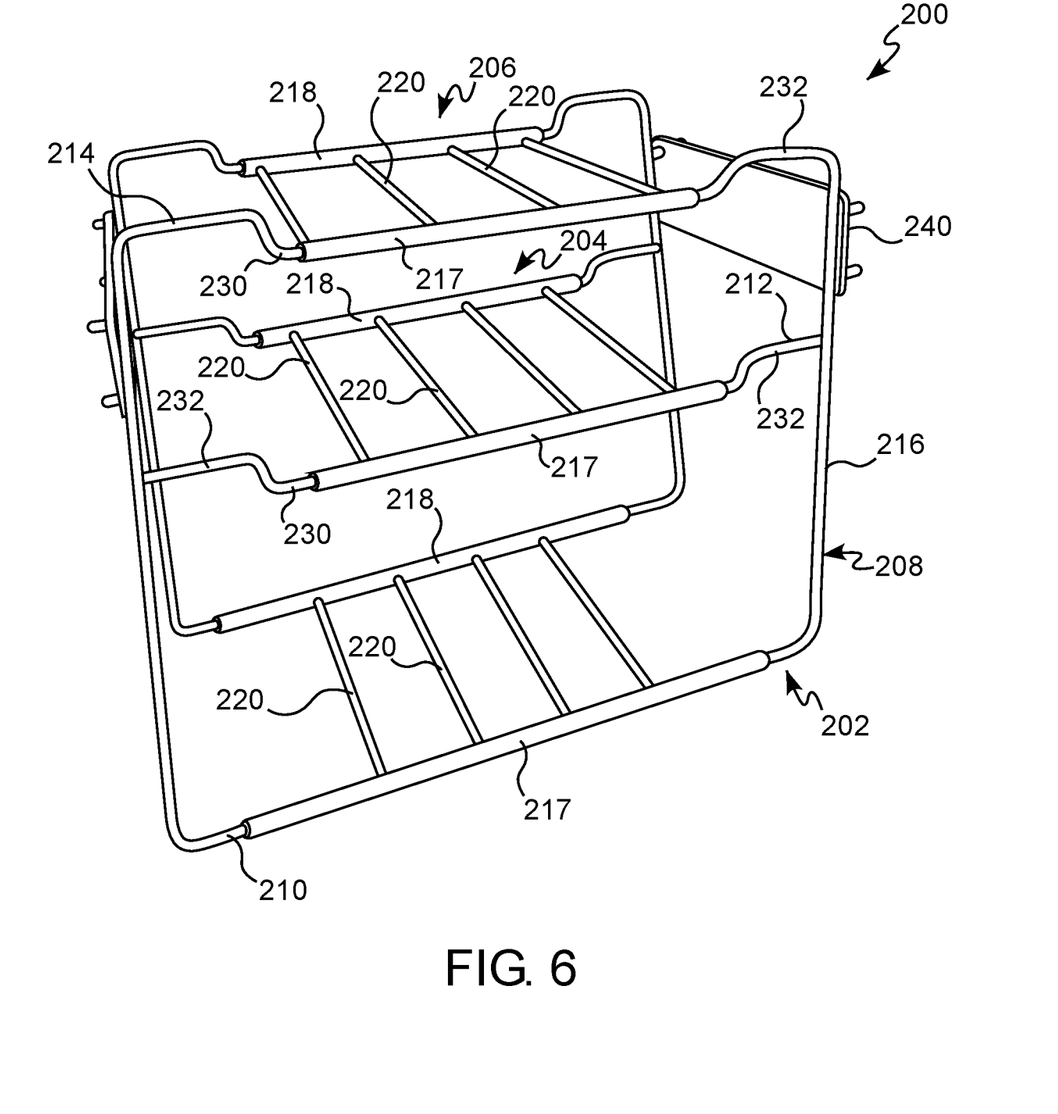
FIG. 6 is a front perspective view of a cookware rack in accordance with another non-limiting embodiment or aspect of the present disclosure, with the cookware rack shown in an assembled position.
Figure 7:
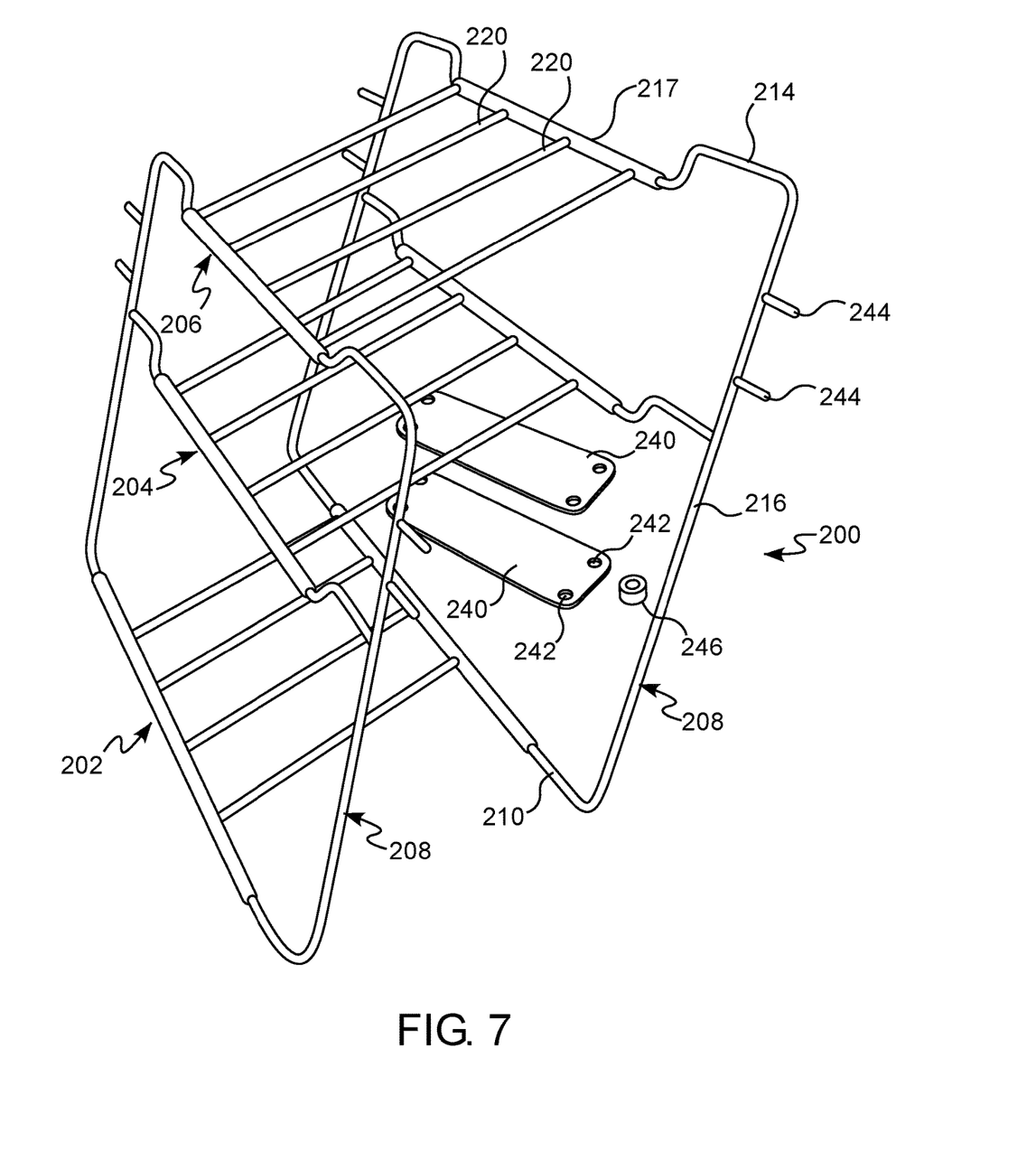
FIG. 7 is a front perspective view of the cookware rack shown in FIG. 6, with the cookware rack shown in a partially assembled position.
Figure 8:
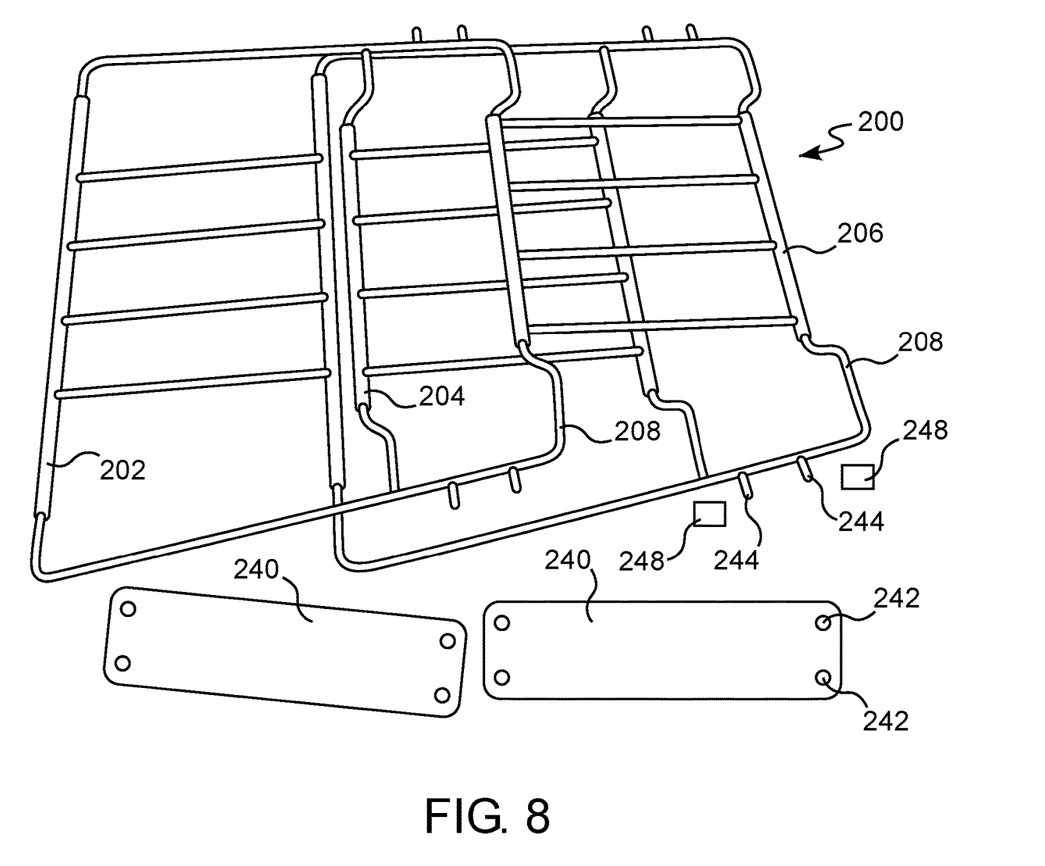
FIG. 8 is a front perspective view of the cookware rack shown in FIG. 6, with the cookware rack shown in a disassembled position.

With reference to FIGS. 6-8, a cookware rack 200 is shown in accordance with another embodiment of the present disclosure. The components of the cookware rack 200 shown in FIGS. 6-8 are substantially similar to the components of the cookware rack 100 described herein with reference to FIGS. 1-3. Reference numerals in FIGS. 6-8 are used to illustrate identical components of the corresponding reference numerals in FIGS. 1-3, with the exception that the first digit of the three digit reference number is changed from a "1" to a "2". For example, whereas the cookware rack shown in FIGS. 1-3 is identified by a reference number 100, the cookware rack shown in FIGS. 6-8 is identified by a reference number 200. As the previous discussion regarding the cookware rack 100 generally shown in FIGS. 1-3 is applicable to the cookware rack 200 shown in FIGS. 6-8, only the relative differences between the two cookware racks are discussed hereinafter.

Whereas the cookware rack 100 shown in FIGS. 1-5 has a rigid, non-collapsible structure, the cookware rack 200 of FIGS. 6-8 is configured for movement between an assembled position and a disassembled or collapsed position. In the assembled position, the cookware rack 200 is configured for supporting pieces of a cookware set, such as the cookware set 160 described herein with reference to FIGS. 4-5. In the disassembled or collapsed position, the cookware rack 200 is configured for minimizing the volume of space necessary to store the cookware rack 200. In the disassembled or collapsed position, the cookware rack 200 assumes a flattened or substantially planar arrangement that can be easily stored in a drawer or on a shelf with a minimum footprint.

With reference to FIG. 6, the cookware rack 200 has a lower support section 202, an upper support section 206, and an intermediate support section 204 positioned between the lower support section 202 and the upper support section 206. Each of the support sections 202, 204, 206 is configured for supporting a portion of a cookware set, in a manner similar to the support sections 102, 104, 106 discussed herein with reference to FIGS. 1-3.

Each of the support sections 202, 204, 206 is pivotally mounted to a pair of supports 208. Each support 208 has a lower side 210, and upper side 214, and an intermediate side 212 between the lower side 210 and the upper side 214. The sides 210, 212, 214 are connected by posts 216. The spacing between the lower side 210 and the intermediate side 212 may be the same or different than the spacing between the intermediate side 212 and the upper side 214. In some embodiments or aspects, the spacing between the lower side 210 and the intermediate side 212 may be larger than the spacing between the intermediate side 212 and the upper side 214.

With continued reference to FIG. 6, the intermediate side 212 and the upper side 214 have a recessed portion 230 that is vertically offset from end portions 232. In this manner, the recessed portion 230 is positioned in a first plane that is vertically offset from a second plane defined by the end portions 232. A width of the recessed portion 230 is selected such that selected cookware of the cookware set can be received therein. Once positioned in the recessed portion 230, the cookware cannot be removed simply by sliding the cookware relative to the intermediate side 212 or the upper side 214. Instead, the cookware must be first lifted from being supported by the recessed portion 230 before being moved laterally relative to the recessed portion 230. In this manner, the cookware cannot be accidentally bumped and slid off of the intermediate support section 204 or the upper support section 206.

With continued reference to FIG. 6, each of the support sections 202, 204, 206 has a pair of longitudinal sides 217, 218 arranged substantially parallel to each other and offset from each other by a plurality of lateral sides 220. The longitudinal sides 217, 218 and the lateral sides 220 define a substantially planar shape. Each of the longitudinal sides 217, 218 may be tubular and configured to receive one of the sides 210, 212, 214 of the supports 208. With continued reference to FIG. 6, the support sections 202, 204, 206 may have the same surface area to allow the folding of the cookware rack 200 between the assembled position (FIG. 6) and the disassembled position (FIG. 8). Due to this arrangement, the cookware rack 200 may have a substantially rectangular shape when viewed from the front and side.

With reference to FIGS. 7-8, the cookware rack 200 may have at least one locking plate 240 for locking the cookware rack 200 in the assembled position. The at least one locking plate 240 is configured for being removably connected to the supports 208. By connecting the at least one locking plate 240 to the supports 208, the supports 208 can be locked relative to each other to prevent movement of the cookware rack 200 from the assembled position toward the diassembled position. In some embodiments or aspects, a pair of locking plates 240 may be provided, with each locking plate 240 being positioned on opposing sides of the supports 208.

With continued reference to FIGS. 7-8, each locking plate 240 has a plurality of openings 242 extending through the body of the locking plate 240. Each opening 242 is configured to receive a corresponding pin 244 provided on the supports 208. The openings 242 are spaced apart such that each opening receives the pin 244 when the locking plate 240 is connected to the supports 208. In some embodiments or aspects, at least one locking nut 246 or other securing element may be removably connectable to the pins 244 to prevent removal of the locking plate 240 from the supports 208.

The cookware rack 100, 200 may be constructed from one or more sections of wire rod. The sections of wire rod may be joined together by welding, with fasteners, or other mechanical connection arrangements. In some examples, the wire rod may have a circular cross-section. In other examples, the wire rod may have a non-circular cross-section, such as an oval, square, rectangular, triangular, or other geometric shape cross-section. In various examples, the cookware rack 100, 200 may be construed from a wire rod having a uniform diameter along its entire length. For example, the cookware rack 100, 200 may be constructed from a wire rod. Different sections of the cookware rack 100, 200 may be constructed from wire rod having a different diameter. In other examples, the cookware rack 100, 200 may be construed from a wire rod having a non-uniform diameter along at least a portion of its length.

The cookware rack 100, 200 can be made from a metal material, such as stainless steel, a plastic composite material, or a combination thereof. For example, the cookware rack 100 may be made from stainless steel wire rod, such as food grade stainless steel.

Although the disclosure has been described in detail for the purpose of illustration based on what are currently considered to be the most practical, preferred, and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A cookware rack configured for supporting a cookware set, the cookware rack comprising:
    a lower support section, at least one intermediate support section, and an upper support section spaced apart from each other by a plurality of posts, each of the at least one intermediate support section and the upper support section having a pair of intermediate sides connected to a pair of longitudinal sides,
    wherein each longitudinal side of the at least one intermediate support section and the upper support section has a recessed portion that is offset from end portions connected to opposing ends of the recessed portion in a direction toward the lower support section, and
    wherein the pair of intermediate sides are each connected to the recessed portion of the pair of longitudinal sides.

2. The cookware rack of claim 1, wherein the lower support section has a pair of longitudinal sides connected to a pair of lateral sides.

3. The cookware rack of claim 1, wherein the lower support section has a spacer for spacing the cookware rack from a support surface.

4. The cookware rack of claim 3, wherein a height of the spacer is adjustable.

5. The cookware rack of claim 1, wherein a spacing between the lower support section and the at least one intermediate support section is larger than a spacing between the at least one intermediate support section and the upper support section.

6. The cookware of claim 1, wherein a surface area of the lower support section is larger than a surface area of each of the at least one intermediate support section and the upper support section.

7. The cookware rack of claim 1, wherein longitudinal sides of the lower support section, and the longitudinal sides of each of the at least one intermediate support section and the upper support section are parallel to each other.

8. The cookware rack of claim 1, wherein the intermediate sides of the at least one intermediate support section and the upper support section are parallel to each other.

9. The cookware rack of claim 1, wherein the longitudinal sides of each of the at least one intermediate support section and the upper support section are perpendicular to the intermediate sides of the at least one intermediate support section and the upper support section.

10. The cookware rack of claim 1, wherein at least one of the lower support section has at least one intermediate side connected to at least one of a pair of longitudinal sides of the lower support section.

11. The cookware rack of claim 10, wherein the at least one intermediate side of the lower support section is perpendicular to longitudinal sides of the lower support section.

12. The cookware rack of claim 1, wherein the intermediate support section further comprises a pair of lateral sides connected to the longitudinal sides, and wherein each of the lateral sides of the at least one intermediate support section has a handle loop that is spaced apart from the posts by a clearance space.

13. The cookware rack of claim 12, wherein the handle has a U-shape.

14. The cookware rack of claim 1, wherein the cookware rack is made from a metal wire rod.

15. The cookware rack of claim 14, wherein the metal wire rod is made from stainless steel.

* * * * *

UNITED STATES PATENT AND TRADEMARK OFFICE
CERTIFICATE OF CORRECTION

| | |
|---|---|
| PATENT NO. | : 11,317,766 B2 |
| APPLICATION NO. | : 16/660251 |
| DATED | : May 3, 2022 |
| INVENTOR(S) | : William A. Groll |

It is certified that error appears in the above-identified patent and that said Letters Patent is hereby corrected as shown below:

In the Claims

Column 12, Line 6, Claim 6, delete "cookware" and insert -- cookware rack --

Signed and Sealed this
Fifth Day of July, 2022

Katherine Kelly Vidal
*Director of the United States Patent and Trademark Office*